US005323176A

United States Patent [19]

Sugiura et al.

[11] Patent Number: 5,323,176

[45] Date of Patent: Jun. 21, 1994

[54] PRINTER WITH A SELECTIVELY OPERABLE HEATING PROCESSOR

[75] Inventors: Toshiaki Sugiura, Hekinan; Mamoru Imaizumi, Nagoya, both of Japan

[73] Assignee: Brother Kogyo Kabushiki Kaisha, Nagoya, Japan

[21] Appl. No.: 942,192

[22] Filed: Sep. 9, 1992

[30] Foreign Application Priority Data

Oct. 18, 1991 [JP] Japan ................................ 3-271263

[51] Int. Cl.[5] ........................ G01D 9/00; G01D 15/24; G01D 15/16; B41M 1/26

[52] U.S. Cl. ...................................... 346/25; 346/134; 346/140 R

[58] Field of Search ..................... 346/25, 134, 140 R; 355/311; 101/487

[56] References Cited

U.S. PATENT DOCUMENTS 4,617,580 10/1986 Miyakawa .......................... 346/136
4,751,528 6/1988 Spehrley, Jr. et al. .
4,853,706 8/1989 Van Brimer et al. .
4,972,271 11/1990 Koumura .
5,099,289 3/1992 Kurotori et al. .................... 355/290

FOREIGN PATENT DOCUMENTS 64-11841 7/1987 Japan .
2211471 10/1988 United Kingdom .

*Primary Examiner*—Benjamin R. Fuller
*Assistant Examiner*—Craig A. Hallacher
*Attorney, Agent, or Firm*—Oliff & Berridge

[57] ABSTRACT

A printer enables discrimination of the kind of a printing medium and automatically controls whether the medium is to be thermally processed or not by the result of the discrimination, while enabling reversal of the execution or inexecution of the heating process if necessary. A control portion is able to discriminate the kind of a printing paper based on a signal output from a detector and changeover automatically, whether the printing paper is to be thermally processed or not, in moving a diverter from a first position to a second position by controlling a solenoid. A user can reverse the execution or inexecution of a heating process of a printed paper in operating the diverter by the operation of a reverse key provided in a control panel.

18 Claims, 4 Drawing Sheets

PRINTER WITH A SELECTIVELY OPERABLE HEATING PROCESSOR

BACKGROUND OF THE INVENTION

1. Field of the Invention

The present invention relates to a printer having a heating processor which processes a printed medium by heating after characters or patterns are printed on the printing medium by a printing means.

2. Description of the Related Art

An ink jet printer is known which prints characters or patterns on a printing medium with the use of a hot-melt ink, which is a solid at a normal temperature and is melted by heating, and an ink jet printer head. In the case of the ink jet printer, it is possible to print not only on ordinary printing paper but also on a transparent overhead projector film (hereinafter referred to as an OHP film) made of resin to be used for the projection of characters or patterns with an overhead projector. The quantity of jetted ink per dot from an ink jet printer head is very small and its heat capacity is also very small, so that as soon as it sticks on a printing medium it is deprived of heat and hardened. Because of this, the ink is upheaved on the printing surface of a printing medium and the printing surface is rendered uneven. When a printing medium is ordinary printing paper, such unevenness is not a problem. When a printing medium is an OHP film, the convex of ink is very noticeable and the ink is hardened to have a form close to that of a convex lens, which causes a problem as described in the following. An OHP film printed with multicolored inks is often used in an overhead projector and a printed image is projected on a screen being enlarged. When an ink is hardened on the OHP film in a form similar to a convex lens, light is refracted by the ink having a similar form to a convex lens, and distinct colors cannot be projected on a screen. In order to solve such a problem, an image forming method as disclosed in U.S. Pat. No. 4,853,706 has been invented. In the invention, an OHP film is thermally processed on which characters or patterns are printed and the inks are hardened. The inks heated to a temperature higher than the melting point are melted on the OHP film and transformed to an approximately flat form from an approximately convex lens shaped form.

For performing a heating process of an OHP film after it is printed with an ink jet printer, a heating processor has to be prepared separately. In this case, if an OHP film output from an ink jet printer is inserted into a heating processor manually, there can be a problem that the OHP film may be inserted upside down into the heating processor, or fingerprints may be left on the OHP film. Therefore, when an OHP film is to be printed, it is desirable to use an ink jet printer having a built-in heating processor. In other words, for an OHP film it is ideal to perform a series of processes, from printing to a heating process, inside an ink jet printer.

An ink jet printer having a built-in heating processor is proposed. In the ink jet printer, printing is performed on an ordinary printing paper and an OHP film and, as described above, a heating process is necessary for an OHP film and not for ordinary printing paper. In the ink jet printer, there is provided a sensor for determining whether a printing medium is an ordinary printing paper or an OHP film, and whether a heating process is to be performed or not is decided according to the kind of printing medium. Still, there can occur a problem in an ink jet printer in which whether a heating process is necessary or not is decided only by the kind of a printing medium being used. In short, the problem is that a heating process is necessarily performed whenever printing is performed on an OHP film. Thus, in the printing on an OHP film there is a case where a heating process is not needed. When an OHP film is printed with a black ink only, for example, there is no problem in color in the case of projection, so that the heating process is not always needed. Even in a case of color printing on an OHP film, if the printing is a test printing for confirming the printed result, a heating process is not needed. When a heating process is performed, it requires a comparatively long printing time, and also the electric power for a heating process is additionally needed, which raises printing cost. Moreover, printing media are not limited to so simple ones as to be classified into transparent ones and opaque ones. In addition, there are translucent ones such as tracing paper, for example. When the kind of a printing medium is judged by the light transmission of the printing medium, a translucent printing medium as mentioned in the above can be judged as an OHP film, and it can be heat-processed erroneously.

SUMMARY OF THE INVENTION

The present invention is invented for solving the above-mentioned problem. Therefore, an object of the invention is to provide a printer in which the kind of a printing medium is discriminated and whether a heating process is to be executed or not is automatically controlled by the result of discrimination, and the degree of freedom of a user in using the printer is upgraded in such a way as the execution or nonexecution of a heating process can be reversed if necessary.

In order to achieve the above-mentioned object, a printer according to the present invention is provided with a heating process means for heat processing a printed printing medium. The printer comprises a discrimination means for discriminating the kind of a printing medium, a control means for deciding whether the printed medium is to be conveyed to a heating processor or whether the printing medium is to be discharged to the outside of the printer based on the result of the discrimination by the discrimination means, a printing means for printing on the printing medium, a conveyance path switching means for switching the conveyance path of the printed printing medium either to the heating process means or to the outside of the printer based on the decision of the control means, and a reversing means for reversing the decision of the control means.

According to the present invention having the above-mentioned constitution, the discrimination means initially discriminates the kind of printing medium. Based on the result of the discrimination, the control means decides whether the printing medium is to be conveyed to the heating process means or to be discharged to the outside of the printer, and the printing means executes printing. At this time, the control means switches the conveyance path switching means based on the operation of the reversing means. In other words, if the reversing means is operated when the control means decides the execution of a heating process, the printing medium is discharged to the outside of the printer by the conveyance path switching means. If the reversing means is operated when the control means decides the discharge of a recording medium, the recording medium is conveyed to the heating process means by the conveyance path switching means, and a heating process is executed.

BRIEF DESCRIPTION OF THE DRAWINGS

A preferred embodiment of the present invention will be described in detail with reference to the following figures, wherein.

DETAILED DESCRIPTION OF THE PREFERRED EMBODIMENT

Figure 1:
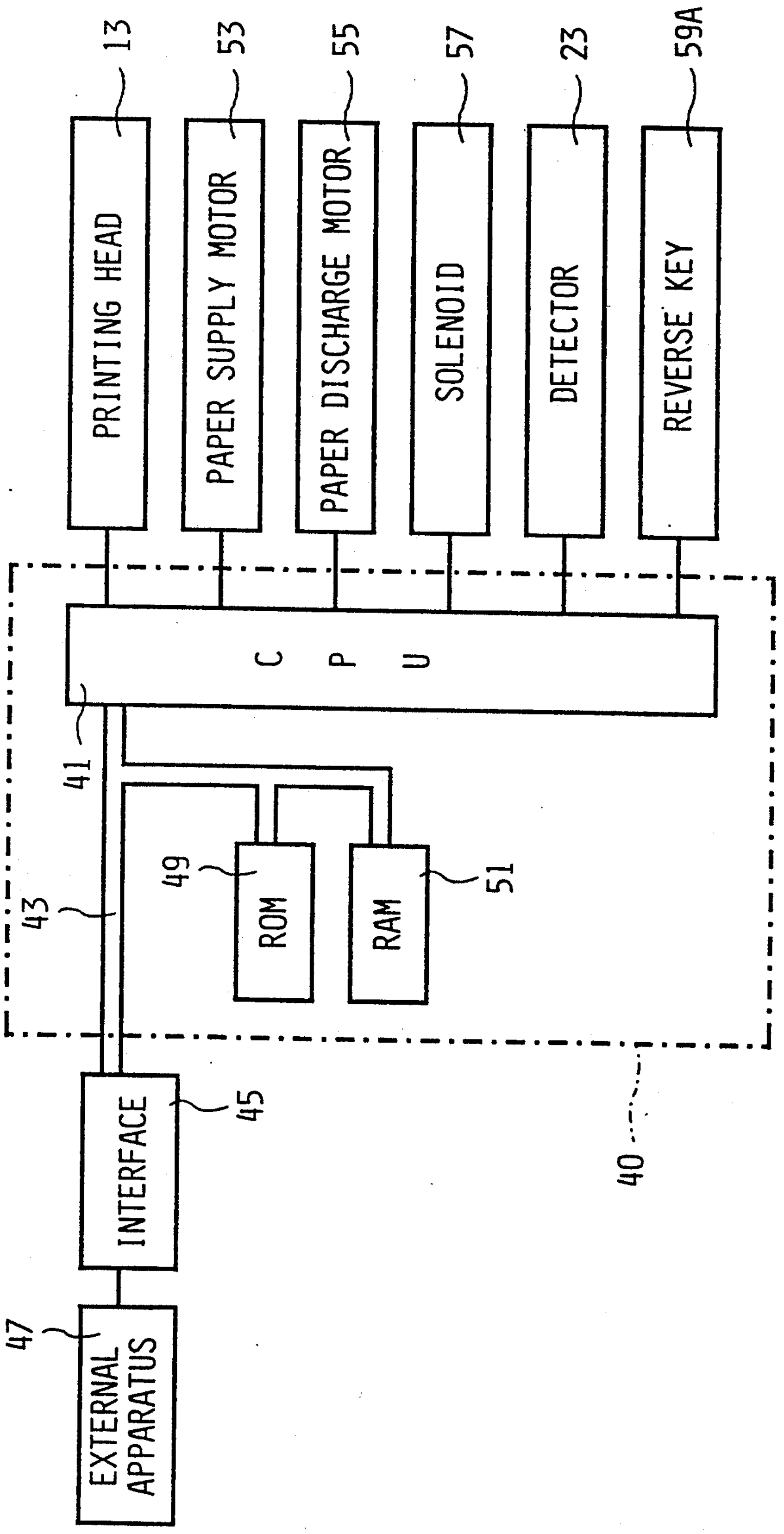
FIG. 1 is a block diagram showing the electrical constitution of a printer in the present embodiment.

An embodiment according to the present invention will be explained in detail referring to the drawings in the following.

Figure 2:
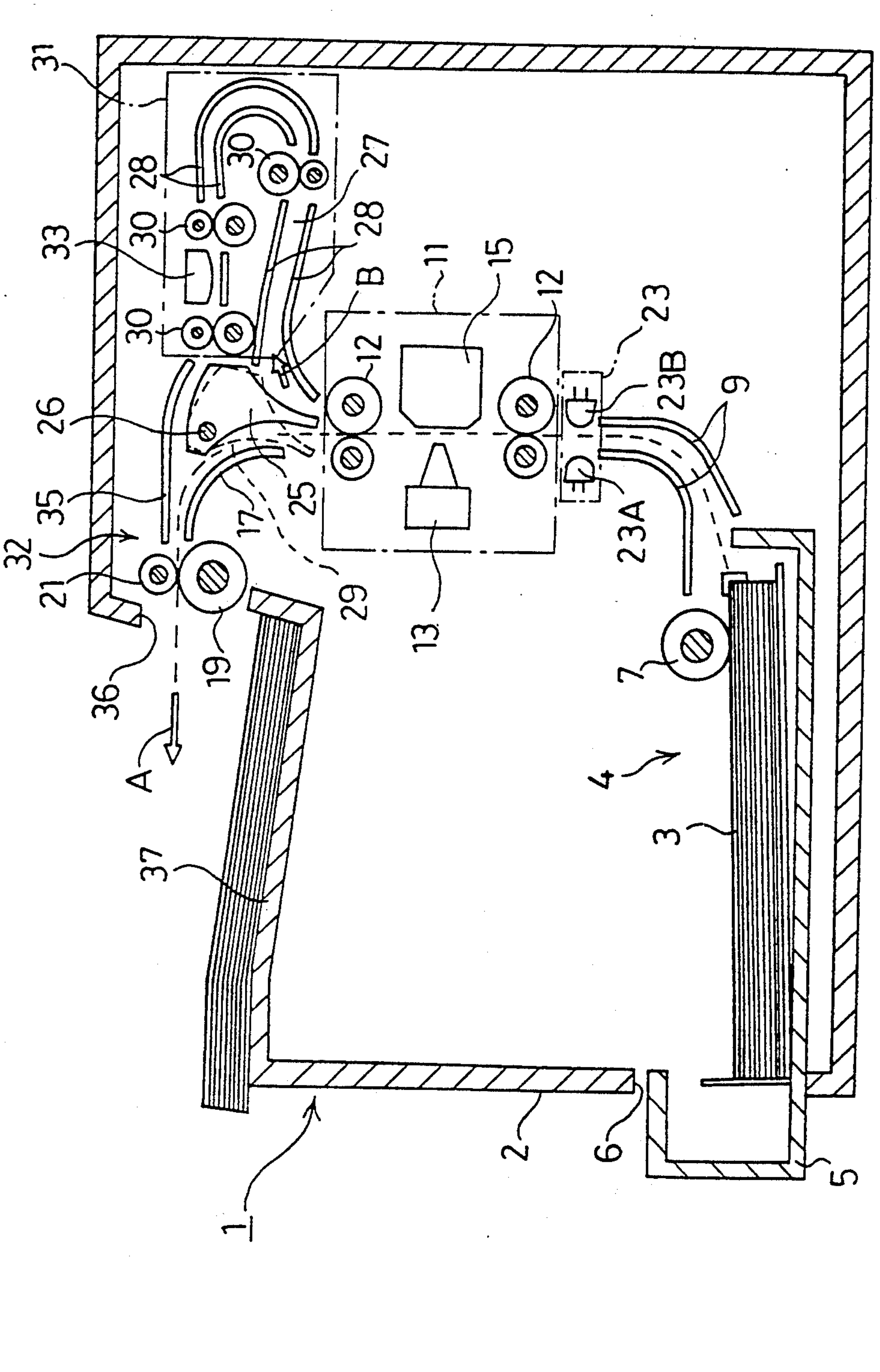
FIG. 2 is a cross sectional view showing a schematic constitution of a printer in the present embodiment.
Figure 3:
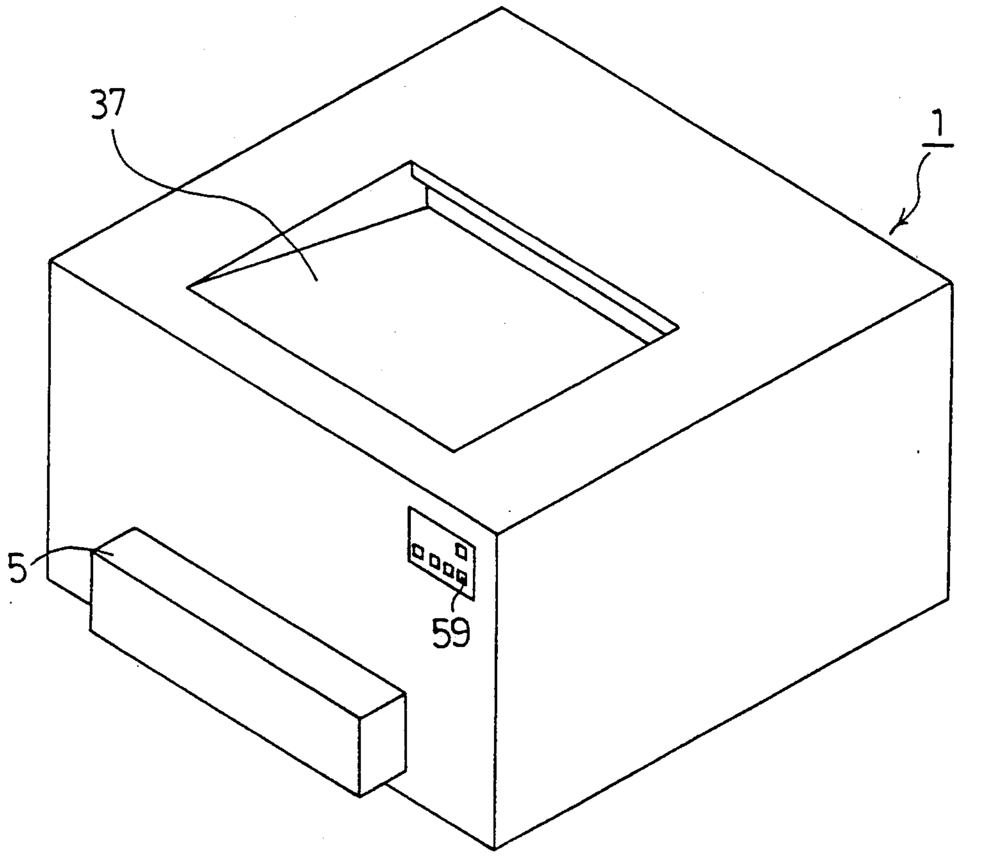
FIG. 3 is a perspective view showing a printer in the present embodiment.

Initially, the constitution of an ink jet printer 1 according to the present embodiment will be explained referring to FIGS. 1 to 3. An external structure 2 of the ink jet printer 1 is made of resin, and it is formed by injection molding. In the upper part of the external structure 2, a paper discharge port 36 is provided from which a printed printing paper 3 is discharged, and under the paper discharge port 36 there is provided a discharged paper tray 37 on which printed printing papers 3 discharged from the ink jet printer 1 are to be piled up. In the lower part of the external structure 2, an opening 6 is provided and a paper supply cassette 5 can be attached to or detached from the opening 6.

The units inside the ink jet printer 1 are broadly classified into a paper supplier 4, a detector 23, a printing unit 11, a diverter 25, a heating processor 31 and a paper discharger 32.

The paper supplier 4 is provided in the lower part of the ink jet printer 1 and comprises the paper cassette 5, a paper supply roller 7 and a paper supply guide plate 9. The paper supply cassette 5 is, as described in the above, provided to be attachable to and detachable from the ink jet printer 1 at the opening 6 which is provided in the lower part of the ink jet printer 1. The paper supply cassette 5 is also made of resin, and the printing papers 3 such as ordinary printing papers or OHP films are stored in it. The printing paper 3 is the printing medium in the present invention. When the paper supply cassette 5 is attached to the ink jet printer 1 at the opening 6 of the external structure 2, the stacked papers 3 are pushed up by a spring, not shown, so that the uppermost paper can abut against the paper supply roller 7. The paper supply roller 7 is made of rubber, and it is rotatably disposed on the somewhat upper right side of the attached paper supply cassette 5. As described in the above, when the paper supply cassette 5 is attached to the ink jet printer 1, the stacked printing papers 3 are pushed up by a spring, not shown, so that the uppermost paper 3 can abut against the paper supply roller 7. The paper supply roller 7 is driven by a paper supply motor 53, and the paper supply roller 7 separates the printing papers 3 sheet by sheet from the paper supply cassette 5, and conveys them outside the paper supply cassette 5. The paper supply guide plate 9 is made of metal, and it is fixedly disposed on the right side of the paper supply roller 7. The paper supply guide plate 9 guides the printing papers 3 conveyed sheet by sheet by the paper supply roller 7 to the detector 23 and to the printing unit 11.

The detector 23 comprises a light emitting diode 23A and a phototransistor 23B fixedly disposed in the upper part of the paper supply guide plate 9. The light emitting diode 23A and the phototransistor 23B are disposed opposingly, and the printing paper 3 conveyed under guidance of the paper supply guide plate 9 is arranged to pass through a gap between the light emitting diode 23A and the phototransistor 23B. When the printing paper is ordinary printing paper, the light emitted from the light emitting diode 23A is interrupted by the printing paper 3 as it passes through the gap and the emitted light does not reach the phototransistor 23B. When the printing paper is an OHP film, the light emitted from the light emitting diode 23A reaches the phototransistor 23B without being interrupted. The detector 23 determines if the printing paper is an ordinary printing paper or an OHP film by the above-mentioned discrimination. The detector 23 outputs a signal indicative of the result of the discrimination, that is, that the printing paper is an ordinary printing paper or an OHP film to a CPU 41, to be explained later. The detector 23 is the discrimination means of the present invention.

The printing unit 11 comprises a pair of rollers 12, a printing head 13 and a platen 15, and it is fixedly disposed in an upper position of the detector 23. The printing head 13 and the platen 15 are disposed opposingly and the printing paper 3 passes through the gap between the printing head 13 and the platen 15. The printing head 13 prints characters or patterns on the printing paper 3 based on the printing data input from an exterior apparatus 47 such as a host computer. The printing head 13 holds melted inks of a plurality of colors and records on the printing paper 3 by jetting a required colored ink against the printing paper corresponding to the printing data. The platen 15 holds the printing paper when it is printed by the printing head 13. The pair of conveying rollers 12 are driven to rotate by a driving source, not shown, and convey the printed paper 3 while holding it between them. A detailed explanation of the constitution and the control procedure of the printing unit 11 will be omitted because it is a well known device. The printing means according to the present invention is comprised of the printing head 13 and the platen 15.

Above the printing unit 11, there are disposed the heating processor 31 on the left side and the printed paper discharger 32 on the right side centering the diverter 25.

The diverter 25 is made of resin and it branches the conveying path for the printing paper 3. The diverter 25 is rotatable on a shaft 26, and normally it is disposed in a first position shown by a solid line in FIG. 2 by a spring, not shown. When the diverter 25 is disposed in the first position, the diverter 25 forms a first conveyance path 29 cooperating with a part of a paper discharge guide plate 17 and a part of a paper discharge guide plate 35. After printing, the printed paper 3 is guided toward a paper discharge roller 19 and a pinch roller 21 in the printing paper discharger 32. The diverter 25 is also rotated to a second position shown by a broken line in FIG. 2 by a solenoid 57, to be explained later. The printing paper 3 is conveyed in a direction B indicated by an arrow and it is guided to the heating processor 31 through a second conveyance path 27. The second conveyance path 27 is comprised of a pair of guide plates 28. The diverter 25 and the solenoid 57 comprise a conveyance path switching means according to the present invention.

The heating processor 31 comprises the pair of guide plates 28, a heating platen 33 and a pair of conveyance rollers 30. The printed printing paper 3 (OHP film) which is guided to the second conveyance path 27 by the diverter 25 disposed in the second position is further guided to the heating platen 33 by the pair of guide plates 28, and it is thermally processed by the heating platen 33. In this case, the printed printing paper 3 is conveyed by the pair of conveyance rollers 30. The heating platen 33 is kept at a temperature higher than the melting point of the hot-melt ink used for printing, and it re-melts the ink jetted against the printed printing paper 3. Then, as described above, the ink which is hardened in a somewhat convex lens shape is transformed to be almost flat. The printing paper 3 which is thermally processed is conveyed to the printing paper discharger 32.

The printing paper discharger 32 comprises the paper discharge guide plates 17 and 35, the paper discharge roller 19 and the pinch roller 21. The printing paper 3 conveyed through the above-mentioned first conveyance path, that is, the printing paper 3 which is not thermally processed, is guided to the paper discharge roller 19 and the pinch roller 21. The paper discharge roller 19 is driven to rotate by a paper discharge motor 55. The pinch roller 21 abuts against the paper discharge roller 19 at a predetermined pressure and it is rotatable. The paper discharge roller 19 rotates while holding the printed paper 3 with the pinch roller 21, and conveys the printed paper 3 in the specific direction (in the direction indicated by an arrow A in FIG. 2) and discharges it onto the discharged paper tray 37 through the discharge port 36 of the external structure 2. The printed paper 3 heat-processed at the heating processor 31 is guided to the paper discharge roller 19 and the pinch roller 21 of the paper discharger through the conveyance path formed of the diverter 25 and the paper discharge guide plate 35 and is discharged onto the discharged paper tray 37 in a similar way.

Next, the electrical constitution of the ink jet printer 1 in the present embodiment will be explained referring to FIG. 1 in the following.

A control portion 40 in the present embodiment comprises the CPU 41 (central processing unit), a ROM 49 (read only memory) and a RAM 51 (random access memory). The ROM 49 and the RAM 51 are connected to the CPU 41 through a bus 43. An interface 45 is also connected to the CPU 41 through the bus 43.

The ROM 49 stores dot patterns corresponding to character codes, a printing process program, to be explained later, and, moreover, a program for controlling each member and the data necessary for the control to be used by the CPU 41.

RAM 51 comprises a receiving buffer which temporarily stores the printing data transmitted from an external apparatus 47 and a printing buffer which stores the dot patterns for a line or several lines manufactured based on the printing data, and temporarily stores the data generated in the course of control of each member by the CPU 41. The external apparatus 47 such as a host computer is connected to the interface 45, and the data from the external apparatus 47 are input to the CPU 41 through the interface 45.

The CPU 41 executes a printing program or a control program stored in the ROM 49. The printing data composed of character codes or control codes are input to the CPU 41 from the external apparatus 47. Moreover, the printing head 13, a paper supply motor 53, the paper discharge motor 55, the solenoid 57, the detector 23, a reverse key 59A, etc. are connected to the CPU 41. The paper supply motor 53 is a motor to drive the paper supply roller 7 to rotate. The paper discharge motor 55 is a motor to drive the paper discharge roller 19 to rotate. The solenoid 57 operates movement of the diverter 25 from the first position to the second position. The reverse key 59A is provided in a control panel 59 which is disposed in the upper part on a front panel of the ink jet printer 1 as shown in FIG. 3, and it is a key for reversing the movement control for the diverter 25 by the CPU 41 based on a signal from the detector 23. If the reverse key 59A is operated in a case where the CPU 41 controls the diverter 25 to stay in the first position based on a signal from the detector 23, the CPU 41 controls the diverter 25 to move to the second position. If the reverse key 59A is operated in a case where the CPU 41 controls the diverter 25 to move to the second position, the CPU 41 controls the diverter 25 to stay in the first position. The reverse key 59A is the reversing means according to the present invention. The CPU 41 drives and controls the printing head 13, the paper supply motor 53, the solenoid 57, etc. based on the printing data, or an output signal of the detector 23 or the reverse key 59A. The control means according to the present invention is comprised of the CPU 41, the ROM 49 and the RAM 51.

Next, the explanation will be given about the operation of the ink jet printer 1 according to the present embodiment referring to FIGS. 1 to 4.

Figure 4:
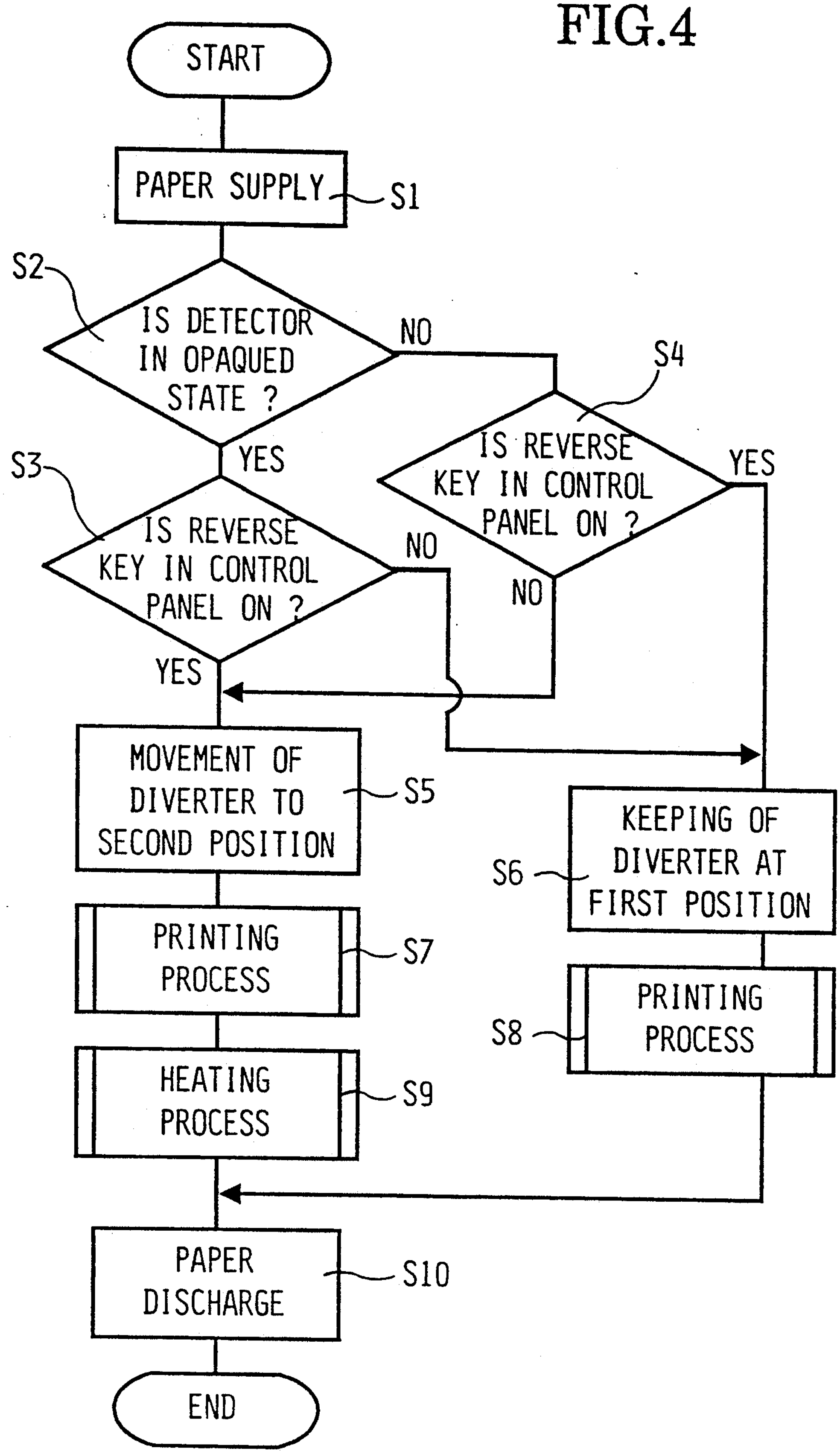
FIG. 4 is a flow chart showing the operation of a printer in the present embodiment.

Printing data are output from the external apparatus 47, and when a predetermined amount of printing data are stored in the receiving buffer of the RAM 51, the operation following the flow chart as shown in FIG. 4 is executed by the CPU 41. At first, the CPU 41 starts driving the paper supply motor 53 and the paper supply motor 53 drives the paper supply roller 7 to rotate. Then, the uppermost printing paper 3 in the paper supply cassette 5 is removed from the paper supply cassette 5 by the paper supply roller 7. The printing paper 3 passes the detector 23 through the paper supply guide plate 9 and is conveyed to the printing unit 11 by the above-mentioned paper supply operation. (Step 1: hereinafter referred to as S1; the same notation is applied to the other steps.)

Next, the kind of printing paper 3 is judged (S2). That is, when the printing paper 3 passes through the detector 23, the CPU 41 activates the light emitting diode 23A for a specific period of time. If the printing paper 3 is an ordinary printing paper, the light emitted from the light emitting diode 23A does not reach the phototransistor 23B being interrupted by the ordinary printing paper. If the printing paper 3 is an OHP film, the light emitted from the light emitting diode 23A reaches the phototransistor 23B through the OHP film. The detector 23 outputs, to the CPU 41, a signal showing whether the printing paper 3 is an ordinary printing paper or an OHP film according to the fact that the emitted light is transmitted or obstructed.

In a case where the printing paper 3 is an ordinary printing paper and a signal showing that the printing paper has an opaque characteristic is output from the detector 23 to the CPU 41 (S2: YES), the CPU 41 judges if the reverse key 59A in the control panel 59 is depressed by a user to render an ON state (S3). When the CPU 41 judges that the reverse key 59A is in an OFF state (S3: NO), the CPU 41 leaves the diverter 25 in the first position without driving the solenoid 57. In this case, the printed printing paper 3 is in a state to be conveyed to the first conveyance path 29 (S6). Then the CPU 41 drives the printing head to execute printing based on the printing data on the printing paper 3 (an ordinary paper, etc.) (S8). In the last step, the CPU 41 drives the conveyance roller 12 and conveys the printed printing paper to the paper discharge roller 19 through the first conveyance path 29. Further, the printed printing paper 3 is moved while being held between the paper discharge roller 19 driven to rotate by the CPU 41 and the pinch roller 21 to be discharged onto the discharged paper tray 37 through the discharge port 36 (S10).

When the printing paper 3 has an opaque characteristic (S2: YES) and the reverse key 59A is in an ON state (S3: YES), the CPU 41 drives the solenoid 57 to move the diverter 25 from the first position to the second position. Then, the printed printing paper 3 comes into a state to be conveyed to the second conveyance path 27 (S5). After that, the CPU 41 drives the printing head 13 and the conveyance roller 12 to execute a printing process on the printing paper conveyed to the printing unit based on the printing data (S7). The printed printing paper 3 is conveyed to the heat processor 31 through the second conveyance path 27. The printed paper conveyed to the heating processor 31 is heated by the heating platen 33. In this case, the surface of the printing paper 3 on a not-printed side, that is, the back side of the printing paper 3 abuts against the heating platen 33 and the printing paper 3 is heated from the back side. As described in the above, the ink on the printed surface is re-melted and becomes substantially flat (S9). The thermally processed printing paper 3 is conveyed to the paper discharge roller 19 under guidance of a conveyance path composed of the paper discharge guide plate 35 and the diverter 25, and further, it is discharged onto the discharged paper tray 37 through the discharge port 36 by the paper discharge roller 19 (S10).

When the printing paper 3 is an OHP film, etc., and a signal showing that it has a transmitting characteristic is output from the detector 23 to the CPU 41 (S2: NO), the CPU 41 judges if the reverse key 59A in the control panel 59 is operated by a user to be in the ON state (S4) similar to the case of S3. When the CPU 41 judges that the reverse key 59A is in an OFF state (S4: NO), the steps S5, S7, S9 and S10 as described above are executed and the thermally processed printed printing paper 3 is discharged onto the discharged paper tray 37.

On the other hand, when the printing paper 3 is an OHP film and the like and it has a transmission characteristic (S2: NO) and if the CPU 41 judges that the reverse key 59A is in an ON state (S4: YES), the steps S6, S8 and S10 are executed, and after printing, the printed paper 3 is discharged onto the discharged paper tray 37 without being thermally processed.

Therefore, normally after printing, the heating process can be automatically executed corresponding to the result of discrimination about the kind of printing paper 3. There can, however, occur a case where heating process is needed or not needed. In such a case, according to the judgment of a user, execution or inexecution of a heating process can be reversed by the operation of the reverse key 59A. Thereby, even in a case of a translucent printing paper such as a tracing paper, execution or inexecution of a heating process can be selected by the operation of the reverse key 59A. Even in a case of an OHP film, if the printing is a trial color printing and the observation with an overhead projector is not needed or the film is printed with only a black ink, the film is not thermally processed by placing the reverse key 59A in an ON state. The resultant effect is that a printing speed can be upgraded and a cost can be cut down.

The present invention is not limited to the above-mentioned embodiment, and various modifications may be made thereto within the true spirit and scope of the invention.

In place of the reverse key 59A in the control panel 59, a rejection key for a heating process may be provided, for example.

In the present embodiment, the diverter 25 is always disposed in the first position where a heating process is not executed, however, it can be disposed in the second position.

In the present embodiment, an explanation is provided about an ink jet printer, however, the invention can be utilized for any printing apparatus having a heating processor.

What is claimed is:

1. A printer having heating means for heating a printed recording medium, comprising:

printing means for printing on said recording medium;

a first conveyance path guiding the printed recording medium to a discharge port;

a second conveyance path guiding the printed recording medium to said heating means;

conveyance path switching means for switching the conveyance path of the printed recording medium to one of said first conveyance path and said second conveyance path, said conveyance path switching means being movable between a first position which feeds the printed recording medium to said first conveyance path and a second position which feeds the printed recording medium to said second conveyance path;

discrimination means for determining a medium type of said recording medium;

control means for deciding whether said recording medium is to be fed to said first conveyance path or to said second conveyance path based on the determined medium type and reversing means for overriding control of said conveyance path switching means by said control means.

2. The printer according to claim 1, wherein said medium type comprises one of a transparent recording medium and an opaque recording medium.

3. The printer according to claim 1, wherein said printing means comprises:

a printing head jetting an ink toward said recording medium; and a platen supporting said recording medium.

4. The printer according to claim 1, wherein said conveyance path switching means comprises:

a solenoid which is controlled by said control means; and a diverter which is normally positioned at a first position, said diverter being moved by said solenoid from the first position to a second position.

5. The printer according to claim 1, wherein said reversing means comprises a reverse key provided on the printer, wherein said control means reverses the decision in response to the signal input from said discrimination means and controls said conveyance path switching means when said reverse key is turned to an on state.

6. The printer of claim 1, wherein the discrimination means comprises:

a light emitting element; and a light receiving element;

the light receiving element generating a signal upon receiving light emitted from the light emitting element, the light emitting element and the light receiving element arranged to selectively generate the signal based on the medium type.

7. The printer of claim 6, wherein the light emitting element is positioned oppositely from the light receiving element, a gap being provided between the light emitting element and the light receiving element; and wherein when the recording medium passes between the light emitting element and the light receiving element, said discrimination means outputs a medium type signal indicative of the medium type to the control means.

8. The printer of claim 6, wherein the control means selects the first conveyance path when the medium type signal is indicative of a light-transmitting medium and the control means selects the second conveyance path when the medium type signal is indicative of an opaque medium.

9. A printer, comprising:

printing means for printing a printed image on a recording medium;

heater means for heating the recording medium, the recording medium bearing the printed image;

determining means for determining a medium type of the recording medium;

a first conveyance path for conveying the recording medium from the printing means to the heater means;

a second conveyance path for conveying the recording medium from the printer means to an exterior of the printer;

control means for selecting one of the first and second conveyance paths in response to the determined medium type;

conveyance path switching means for switching between the first and second conveyance paths in response to the selected conveyance path; and overriding means for changing the selected path.

10. The printer of claim 9, wherein the medium type is one of a light-transmitting recording medium and an opaque recording medium.

11. The printer of claim 9, wherein the medium type determining means comprises:

a light emitting element; and a light receiving element;

the light receiving element generating a signal upon receiving light emitted from the light emitting element, the light emitting element and the light receiving element arranged to selectively generate the signal based on the medium type.

12. The printer of claim 11, wherein the light emitting element is positioned oppositely from the light receiving element, a gap being provided between the light emitting element and light receiving element; and wherein when the recording medium passes between the light emitting element and the light receiving element, said determining means outputs a medium type signal indicative of the medium type to the control means.

13. The printer of claim 12, wherein the control means selects the first conveyance path when the medium type signal is indicative of a light-transmitting medium and the control means selects the second conveyance path when the medium type signal is indicative of an opaque medium.

14. The printer of claim 9, wherein the printing means comprises:

an ink jet print head; and a platen for supporting the recording medium opposite the ink jet print head.

15. The printer of claim 9, wherein the conveyance path switching means comprises:

a solenoid; and a diverter;

wherein the solenoid is controlled by the control means and the diverter is normally positioned at a first position and moved by the solenoid to a second position.

16. The printer of claim 15, wherein the first conveyance path is active when the diverter is in the first position and the second conveyance path is active when the diverter is moved to the second position.

17. The printer of claim 15, wherein the second conveyance path is active when the diverter is in the first position and the first conveyance path is active when the diverter is moved to the second position.

18. The printer of claim 15, wherein the overriding means comprises a override key provided on the printer; and wherein the control means changes the selected conveyance path in response to the override key being placed into a first state to select a different conveyance path from the conveyance path originally selected in response to the medium type signal, the switching means switching to the different conveyance path in response to the control means changing the selected conveyance path.

* * * * *